United States Patent [19]

Sykes et al.

[11] 3,985,692

[45] Oct. 12, 1976

[54] CONTROL OF OVERSPRAY IN SOLVENT SYSTEM PAINTS

[75] Inventors: Robert C. Sykes, Winnetka; Joseph F. Vartiak, Naperville, both of Ill.

[73] Assignee: Nalco Chemical Company, Oak Brook, Ill.

[22] Filed: Dec. 5, 1974

[21] Appl. No.: 529,901

[52] U.S. Cl............................... 260/22 CB; 106/13; 260/3; 260/22 R; 260/23 R; 260/23 P; 260/23 H

[51] Int. Cl.$^2$...................... C09D 3/26; C09D 3/36; C09D 3/66

[58] Field of Search................. 260/22 R, 22 CB, 3, 260/23 R, 23 P, 23 H; 106/13

[56] References Cited
UNITED STATES PATENTS

| | | |
|---|---|---|
| 3,393,165 | 7/1968 | Evans et al. ..................... 260/22 CB |
| 3,433,753 | 3/1969 | Farkas et al. ..................... 260/22 A |
| 3,505,256 | 4/1970 | Duffy et al. ..................... 260/22 CB |
| 3,546,146 | 12/1970 | Sockloff et al. ..................... 260/22 R |
| 3,600,346 | 8/1971 | Spatola ..................... 260/22 R |
| 3,786,008 | 1/1974 | Piiroya et al. ..................... 260/22 CB |
| 3,804,787 | 4/1974 | Nicks et al. ..................... 260/22 CB |
| 3,876,576 | 4/1975 | Michalski ..................... 260/22 CB |

*Primary Examiner*—Ronald W. Griffin
*Attorney, Agent, or Firm*—Johnston, Keil, Thompson & Shurtleff

[57] ABSTRACT

Overspraying in solvent system paints is controlled by adding to the paints a fraction of a per cent of an oil soluble polymer, preferably one having a linear hydrocarbon structure derived from an ethylenically unsaturated monomer containing 2 to 5 carbon atoms.

10 Claims, No Drawings

CONTROL OF OVERSPRAY IN SOLVENT SYSTEM PAINTS

BACKGROUND

One of the problems in the application of spray paints is control of overspray or drifting of the paint. This is particularly true of solvent based paints. When such paints are applied by spraying, the pressure exerted on the paint is usually at least 15 psig and as the paint passes through the spray nozzle, fine droplets are formed. The droplets become finer as spray pressures are increased. These fine droplets tend to drift or be carried away from the target by wind or convection currents.

The prevention of drift is particularly important in the use of paints for marking center lines in roadways as well as in many other uses where it is undesirable to have the paint spread to a surrounding area. Thus, in many cases where the surrounding area contains vegetation the ordinary oil based paint would destroy the vegetation.

OBJECTS

One of the objects of the present invention is to provide new and improved oil based paints which contain additives that control drift when the paint is sprayed.

Another object of the invention is to provide a new and improved process for spraying an oil base paint wherein overspray is controlled and minimized. Other objects will appear hereinafter.

BRIEF SUMMARY OF THE INVENTION

In accordance with the invention, overspraying in solvent system paints is controlled by adding to the paints a fraction of a per cent of an oil soluble polymer, preferably one having a linear hydrocarbon structure derived from an ethylenically unsaturated monomer containing 2 to 5 carbon atoms.

DETAILED DESCRIPTION OF THE INVENTION

The oil soluble polymers employed as additives in oil based paints in accordance with the invention are polymers derived from a hydrophobic monomer. These polymers are formed by the polymerization of the monomer, or a mixture of monomers, through an aliphatic unsaturated group. Examples typical of these monomers are styrene, alphamethylstyrene, vinyl toluene, chlorostyrene, vinyl acetate, vinyl chloride, vinyl formate, vinyl alkyl ethers, alkyl acrylates, alkyl methacrylates, ethylene, propylene, n-butylene, isobutylene, etc. The most preferred oil soluble polymers have an average molecular weight of at least about 50,000, most preferably at least 300,000, and in some cases 4–25 million. These polymers which have shown the greatest measure of success have a linear hydrocarbon structure derived from an ethylenically unsaturated monomer containing 2–5 carbon atoms. These monomers may contain one or two unsaturated groups. Among these, polyethylene, polypropylene, polyisobutylene, polybutadiene, polyisoprene and copolymers thereof have shown the most promise. Polyisobutylene and polyisoprene (natural rubber), are the most preferred of this group.

The oil based paint can be any of the usual types of oil based paints containing drying oils, turpentine or other thinners, resinous binders, hydrophobic solvents and pigments. Such paints are non-aqueous and the pigment may either be dispersed or dissolved in the paint.

The amount of oil soluble polymer added to the paint should be sufficient to reduce drifting or overspray and is usually within the range of 0.0015 to 0.01% by weight, preferably around 0.005% by weight. The amount of polymer added for the purpose of controlling overspray should also preferably be a substantially non-viscosity increasing amount. Too large an amount will not produce the desired results and will defeat the purpose of the invention.

The polymers which are added to the oil based paints are usually solids and inasmuch as the amount required to effect drift controlling of the paint is extremely small, it is usually preferable to prepare the oil soluble polymer as a solution in an organic solvent which is compatible with the organic solvent as well as the other constituents of the oil based paint. The amount of the oil soluble polymer in the solution of organic solvent may vary but is usually within the range of 1 to 10% by weight and preferably about 3% by weight. Any of the well known organic solvents which are employed in paint, such as, for example, xylene, naphtha thinners, as well as toluene, benzene, and other organic solvents, can be employed to prepare solutions of the oil soluble polymer which are added to the oil based paints in drift controlling amounts.

Oil based paints usually contain organic solvents such as, for example, xylene, or VM and P naphtha, which act as thinners and are evaporated after the paint is applied and dried. The paint also contains binders which can be resins or drying oils that form films when the paint is dried, together with pigments which are dispersed or dissolved in the paint.

The present invention is especially useful in connection with air drying spray paints but can also be applied to spray paints where the paint is cured by baking it on a substrate or by ultraviolet light curing.

By the term "soluble", as applied to the property of the polymers of the invention of being able to be incorporated into oil based paints, is meant the ability of being solubilized or dispersed in at least use amounts in the paint to which they are added.

The invention will be further illustrated but is not limited by the following examples in which the quantities are stated in parts by weight unless otherwise indicated.

EXAMPLE I

A typical air drying spray paint to which the invention is applicable has the following composition:

| Ingredients | Percent by Weight |
| --- | --- |
| Titanium dioxide | 21 |
| Carbon black | 0.7 |
| Soya Alkyd Solution (50% Solids) | 56 |
| Cobalt naphthenate | 0.3 |
| Xylene (organic solvent) | 22 |

In order to provide drift control there is mixed with this paint approximately 0.15% by weight of a solvent solution of polyisobutylene having an average molecular weight of $4.7 \times 10^6$ dissolved in xylene so as to give a solution having a 3% by weight concentration of polyisobutylene. This amount of polyisobutylene corresponds to approximately 0.0045% by weight of the oil based paint.

EXAMPLE II

The procedure was the same as in Example I except that the oil based paint has the following composition:

| Ingredients | Percent by Weight |
|---|---|
| Titanium dioxide | 22.3 |
| Styrenated alkyd resin solution | 52 |
| Xylene | 25 |
| Lead naphthenate | 0.35 |
| Cobalt naphthenate | 0.35 |

The styrenated alkyd solution contains approximately 50% by weight solids, the remainder being styrene.

It will be recognized that the invention is applicable to many different types of solvent based paints, all of which contain organic solvents, binders and pigments and are essentially free from water.

The invention is hereby claimed as follows:

1. A sprayable oil based paint containing an oil soluble hydrocarbon polymer formed by the polymerization of at least one hydrophobic hydrocarbon monomer through an aliphatic hydrocarbon unsaturated group and having a molecular weight of at least 50,000, the quantity of said polymer being sufficient to reduce overspray when said paint is sprayed but insufficient to substantially increase the viscosity of said paint and constituting 0.0015% to 0.01% by weight of said paint.

2. A composition as claimed in claim 1 wherein said monomer is a hydrocarbon containing one or two unsaturated groups and 2 to 5 carbon atoms.

3. A composition as claimed in claim 1 in which said polymer is a polyisobutylene polymer.

4. A composition as claimed in claim 1 in which the amount of said polymer is approximately 0.005% by weight of said oil based paint.

5. An oil based paint as claimed in claim 1 in which said oil soluble polymer is selected from the group consisting of polyethylene, polypropylene, polyisobutylene, polybutadiene, polyisoprene and copolymers thereof.

6. In a process of controlling overspray in oil based paints, the improvement which comprises incorporating into the oil based paint a drift controlling but a substantially non-viscosity increasing amount of an oil soluble hydrocarbon polymer formed by the polymerization of at least one hydrophobic hydrocarbon monomer through an aliphatic hydrocarbon unsaturated group and having a molecular weight of at least 50,000, the amount of said polymer added to said oil based paint being within the range of 0.0015 to 0.01% by weight of said oil based paint.

7. A process as claimed in claim 6 in which said monomer is a hydrocarbon containing one or two unsaturated groups and 2 to 5 carbon atoms.

8. A process as claimed in claim 6 in which said polymer is a polyisobutylene polymer.

9. A process as claimed in claim 6 in which the amount of said polymer is approximately 0.005% by weight of said oil based paint.

10. A process as claimed in claim 6 in which said oil soluble polymer is selected from the group consisting of polyethylene, polypropylene, polyisobutylene, polybutadiene, polyisoprene and copolymers thereof.

* * * * *